5779X
E. Perkins,
Spreading Blister Cloth.
Patented Jan. 15, 1830.
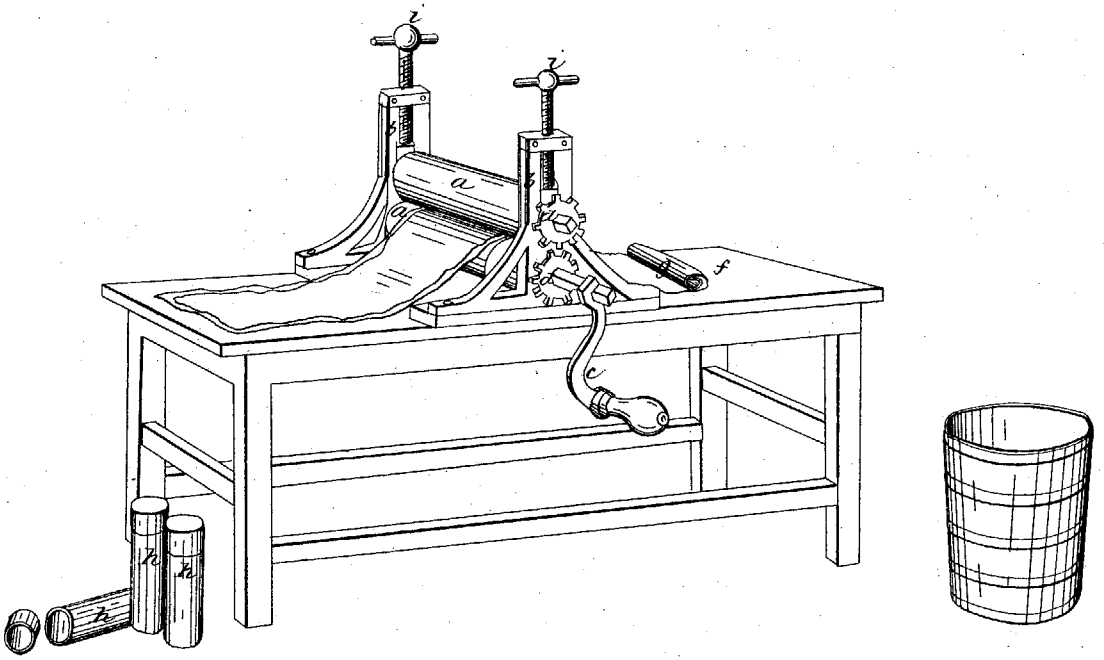
AM. PHOTO-LITHO. CO. N.Y. (OSBORNE'S PROCESS)

Elisha Perkins
Letters Patent

The Schedule referred to in these Letters Patent and making part of the same containing a description in the words of the said Elisha Perkins himself of his improvement in the mode of spreading or manufacturing Blister Plaister.

---

To all to whom these Presents shall come

Elisha Perkins of the City of Baltimore in the state of Maryland Physician sendeth greeting. Be it known that I, said Elisha Perkins have invented made and applied to use a new & useful improvement in the mode of spreading or manufacturing blister plaister (commonly called blister cloth) which I call my "Improved blister plaister" & which I specify in the words following, viz. This Improvement consists in the spreading of the plaister by means of two cylindrical rollers of cast iron, brass or other hard metal & in spreading the fly altogether upon the surface of the plaister, whereby its action when applied to use, is rendered uniform, certain & effectual, instead of mixing the fly, as has been heretofore done, throughout the whole of the composition matter of the plaister, which causes the action of the fly to be always in some degree uncertain, sometimes only partial & often wholly unavailing. I use rollers about twenty five inches in length & about five inches in diameter. they may be a little smaller or larger with equal advantage. They are fixed in a frame so that the rollers lie in a horizontal position, one directly above the other; in the manner of those used in making copper plates, or in rolling copper & iron sheets. The motion is communicated to the lower cylinder by a crank or wench affixed to one end, which I turn by hand, but which may be turned by any other power, motion is communicated from the under roller to the upper one by small spur wheels attached to the axis or gudgeons of the rollers at the end where the crank is so that the velocity of of both rollers is the same, when in motion. When to be used in spreading the plaister, the upper roller is taken out of the frame, & heated in boiling water, sufficiently to soften the composition matter of the plaister to be spread. Thus heated the cylinder or roller is fixed in the frame, & both being properly screwed up & adjusted, one end of the cloth is put smooth between the rollers on the side to be received while they are in motion & at the same time time a roll of the composition matter for the plaister without any admixture of the fly is laid upon & across the cloth, & kept pressed steadily & firmly against it & the rollers until the whole length of the cloth, which may be two yards more or less, has passed thro; the rollers, being drawn by hand on the side opposite to that in which it enters so as to prevent it from being wrapped around the lower cylinder & to keep it smooth. In being thus passed thro' the rollers, the plaister is uniformly, firmly, & completely spread. It is then delivered to the hands of another person, who immediately dusts or spreads the fly over the surface, while the plaister is warm & carefully folds up the cloth & presses it together with the hands to cause the fly to adhere; when the rollers are cold, the plaister being also cold or cool, is, with the fly dusted thereon as above mentioned, again passed thro' the rollers which effectually secures the fly upon the surface, & prepares the plaister for use. As a matter of convenience I put up cloths, each two yards long, in tin boxes for safe keeping, for sale & transportation. This however I do not consider a necessary part of my specification.

In testimony that the above is a true specification of my said improvement as above described, I have hereto set my hand & seal the twenty sixth day of Decr in the year of our Lord one thousand eight hundred and twenty nine Witnesses
James Blair
Richard Whitworth Elisha Perkins